(12) United States Patent
Ostwald et al.

(10) Patent No.: US 6,609,046 B2
(45) Date of Patent: Aug. 19, 2003

(54) SYSTEM FOR SELECTING A ROBOTIC MECHANISM BEST SUITED TO PERFORM A JOB FROM MULTIPLE ROBOTIC MECHANISMS IN A STORAGE LIBRARY

(75) Inventors: Timothy C. Ostwald, Louisville, CO (US); James Ries, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/307,606

(22) Filed: Dec. 2, 2002

(65) Prior Publication Data

US 2003/0083777 A1 May 1, 2003

Related U.S. Application Data

(62) Division of application No. 09/746,048, filed on Dec. 21, 2000, now Pat. No. 6,532,402.

(51) Int. Cl.[7] .............................................. G06F 47/00
(52) U.S. Cl. ...................................................... 700/214
(58) Field of Search ................................ 700/213, 214, 700/215, 218, 225, 226, 228, 229, 245, 255, 250, 28, 34

(56) References Cited

U.S. PATENT DOCUMENTS

| | | |
|---|---|---|
| 4,864,438 A | 9/1989 | Munro |
| 4,937,690 A | 6/1990 | Yamashita et al. |
| 5,343,403 A | 8/1994 | Beidle et al. |
| 5,377,121 A | 12/1994 | Dimitri et al. |
| 5,522,090 A | 5/1996 | Tanaka et al. |
| 5,557,528 A | 9/1996 | Munro et al. |
| 5,646,918 A | 7/1997 | Dimitri et al. |
| 5,768,141 A | 6/1998 | Hanaoka et al. |
| 5,818,723 A | 10/1998 | Dimitri |
| 5,867,388 A | 2/1999 | Okumura et al. |
| 5,956,301 A | 9/1999 | Dimitri et al. |
| 6,029,230 A | 2/2000 | Ng |
| 6,038,490 A | 3/2000 | Dimitri et al. |
| 6,052,341 A | 4/2000 | Bingham et al. |
| 6,230,075 B1 | 5/2001 | Nishijo et al. |
| 6,393,335 B1 | 5/2002 | Ostwald |
| 6,421,579 B1 | 7/2002 | Dimitri et al. |
| 6,532,402 B2 * | 3/2003 | Ostwald et al. ............. 700/250 |

* cited by examiner

Primary Examiner—Khoi H. Tran
(74) Attorney, Agent, or Firm—Brooks & Kushman P.C.

(57) ABSTRACT

A method and system for selecting a robotic mechanism best suited to perform a job from different types of robotic mechanisms in an automated storage library includes gathering variables in a criteria database to form a decision algorithm. The robotic mechanisms are operable for performing the same types of tasks. The variables include attributes of each robotic mechanism type and attributes of each of the robotic mechanisms, media objects, and media object players. In response to attributes of a job request being transferred into the decision algorithm, the decision algorithm selects a robotic mechanism best suited for performing the job request based on the attributes of each robotic mechanism type and the attributes of the robotic mechanisms, media objects, media object players, and the job request.

17 Claims, 3 Drawing Sheets

SYSTEM FOR SELECTING A ROBOTIC MECHANISM BEST SUITED TO PERFORM A JOB FROM MULTIPLE ROBOTIC MECHANISMS IN A STORAGE LIBRARY

CROSS-REFERENCE TO RELATED APPLICATIONS

This application is a divisional of U.S. application Ser. No. 09/746,048, filed on Dec. 21, 2000, now U.S. Pat. No. 6,532,402.

BACKGROUND OF THE INVENTION

1. Field of the Invention

The present invention relates generally to automated data storage libraries having robotic mechanisms for manipulating media objects within the storage libraries and, more particularly, to an automated data storage library method and system in which a robotic mechanism most suitable to perform a job is selected from a plurality of robotic mechanisms based on criteria stored in a criteria database.

2. Background Art

Existing automated media storage libraries are capable of storing and retrieving large quantities of information stored on media objects such as cartridges. This is accomplished by the use of a large number of cartridge storage cells, each of which houses a media cartridge, that are housed within an enclosure. Such storage libraries use a robotic mechanism (e.g., robot, picker, handbot, accessor, and the like) to move the media cartridges between their media cartridge storage cells and media cartridge players (e.g., a cartridge drive). For example, to retrieve information stored on a selected media cartridge, a robotic mechanism moves to a location opposite the media cartridge storage cell housing the selected media cartridge. An end effector of the robotic mechanism then grasps the media cartridge and extracts it from the media cartridge storage cell to a media cartridge player where the end effector loads the media cartridge into the media cartridge player.

As automated storage libraries have become larger and more complex, their designs have evolved from a single robotic arm performing all media cartridge manipulations to multiple robotic mechanisms operating independently on several media cartridges and media cartridge players simultaneously. The ability to manipulate several media cartridges simultaneously has increased the throughput of the automated storage libraries. While one robotic mechanism is busy transferring one media cartridge from a media cartridge storage cell for mounting into a media cartridge player, a second robotic mechanism can be transferring another media cartridge to an access port, while a third robotic mechanism may be conducting an inventory of the storage library.

A typical storage library includes tracks laid out throughout the storage library. Robotic mechanisms mount to the tracks to move throughout the storage library to access the media cartridges and the media cartridge players. A problem with typical automated storage libraries having multiple robotic mechanisms is that the redundancy resulting from multiple robotic mechanisms is not fully taken advantage of because the robotic mechanisms are not efficiently allocated to perform jobs. For instance, some storage libraries do not take into account any factors when assigning a robotic mechanism from a group of robotic mechanisms to perform a job within the storage library. These storage libraries do not acknowledge that a particular robotic mechanism may be best suited for the job while other robotic mechanisms may be ill suited. Other than basic position and availability information, typical storage libraries do not take into account the different factors associated with the redundancy resulting from many robotic mechanisms when selecting one of the robotic mechanisms to perform a job. In essence, typical automated storage libraries do not select a robotic mechanism from a group of robotic mechanisms for performing a job in the most detailed possible manner.

SUMMARY OF THE INVENTION

Accordingly, it is an object of the present invention to provide a method and system for selecting a robotic mechanism best suited to perform a job from multiple robotic mechanisms in an automated storage library.

It is another object of the present invention to provide an automated storage library method and system in which a robotic mechanism most suitable to perform a job is selected from a plurality of robotic mechanisms based on criteria stored in a criteria database.

It is a further object of the present invention to provide an automated storage library method and system having a criteria database which forms a decision algorithm based on different factors to select a robotic mechanism most suitable to perform a job from a plurality of robotic mechanisms.

It is still another object of the present invention to provide an automated storage library method and system which determines criteria associated with a job and then selects a robotic mechanism best suited to perform the job based on the determined criteria.

It is still a further object of the present invention to provide an automated storage library method and system which gathers inputs from host variables, internal storage library variables, operator variables, and manufacturer variables to form a decision algorithm used for selecting a robotic mechanism best suited to perform a job from a plurality of robotic mechanisms.

In carrying out the above objects and other objects, the present invention provides a method for operating an automated storage library having a plurality of robotic mechanisms, media objects, and media object players. The method includes gathering variables in a criteria database to form a decision algorithm. The variables include attributes of each of the plurality of robotic mechanisms, media objects, and media object players. Attributes of a job request are then transferred into the decision algorithm. The decision algorithm is then used to select a robotic mechanism best suited for performing the job request from the plurality of robotic mechanisms based on the attributes of each of the plurality of robotic mechanisms, media objects, and media object players and the attributes of the job request. The selected robotic mechanism is then controlled to perform the job request.

The variables may include host variables, internal storage library variables, storage library operator variables, and storage library manufacturer variables. The host variables may include information regarding at least one of job priority, job data set size, and job multi-cartridge data set size.

The internal storage library variables may include information regarding at least one of media object type, media object quantity, and media object position; information regarding at least one of media object player type, media object player quantity, and media object player position; information regarding at least one of robotic mechanism availability, and robotic mechanism proximity to media objects, media object players, and other robotic mechanisms; information regarding at least one of robotic mechanism age, robotic mechanism reliability, robotic mechanism condition, and robotic mechanism identification number (FRU level); and information regarding at least one of storage library guide track conditions, storage library environmental conditions, and storage library maintenance.

The operator variables may include information regarding time of day of operation of the storage library. The manufacturer variables may include information regarding storage library performance upgrades, marketing requirements, and special operator requirements.

In carrying out the above objects and other objects, the present invention further provides an automated storage library for the storage and retrieval of media objects. The storage library includes a frame having media object storage cells for storing media objects and at least one media object player for playing the media objects. The storage library further includes at least two robotic mechanisms each movable within the frame to mount a media object from a media object storage cell into the at least one media object player and to dismount a media object from the at least one media object player into a media object storage cell.

The storage library also includes a controller for gathering variables in a criteria database to form a decision algorithm. The variables include attributes of each of the robotic mechanisms, media objects, and media object players. The controller is operable for transferring attributes of a job request into the decision algorithm, and then using the decision algorithm to select a robotic mechanism best suited for performing the job request from the at least two robotic mechanisms based on the attributes of each of the at least two robotic mechanisms, the media objects, and the at least one media object player and the attributes of the job request. The controller is further operable for controlling the selected robotic mechanism to perform the job request. The frame may be a rectangular frame, a round frame, or the like.

The advantages associated with the present invention are numerous. Performance, reliability, and flexibility of an automated storage library is improved with multiple redundant robotic mechanisms. The present invention takes advantage of the redundant aspects of the storage library.

Imagine an operator wanting to add ten new robotic mechanisms to mix in a storage library having ten old robotic mechanisms. The operator wants to use the old robotic mechanisms more than the new robotic mechanisms to wear them out and get them out of the storage library, but wants to use the new robotic mechanisms for high priority moves to get media cartridges mounted faster and maybe use the old robotic mechanisms just for media cartridge dismounts. This illustration represents the type of information that can be put into the criteria database such that the storage library operates in accordance with the operator's instructions. The criteria database can be expanded at any time to account for new developments including metrics for component reliability, duty cycle counters, and field serviceable components.

The above objects and other objects, features, and advantages of the present invention are readily apparent from the following detailed description of the best mode for carrying out the present invention when taken in connection with the accompanying drawings.

DETAILED DESCRIPTION OF THE PREFERRED EMBODIMENT(S)

In general, the present invention is a method and system for selecting a robotic mechanism best suited to perform a job from multiple robotic mechanisms in an automated storage library. In a storage library having multiple robotic mechanisms the redundant robotic mechanisms gives the storage library a choice in selecting the optimum robotic mechanism for each job. In a broad sense, the present invention controls the selection of the individual robotic mechanisms for performing jobs based on various optimizations. A series of inputs are used to create a decision algorithm which adapts to various conditions for selecting a robotic mechanism best suited to perform a job. The inputs used in forming the decision algorithm include host variables, internal storage library variables, operator variables, and manufacturer variables.

Figure 1:
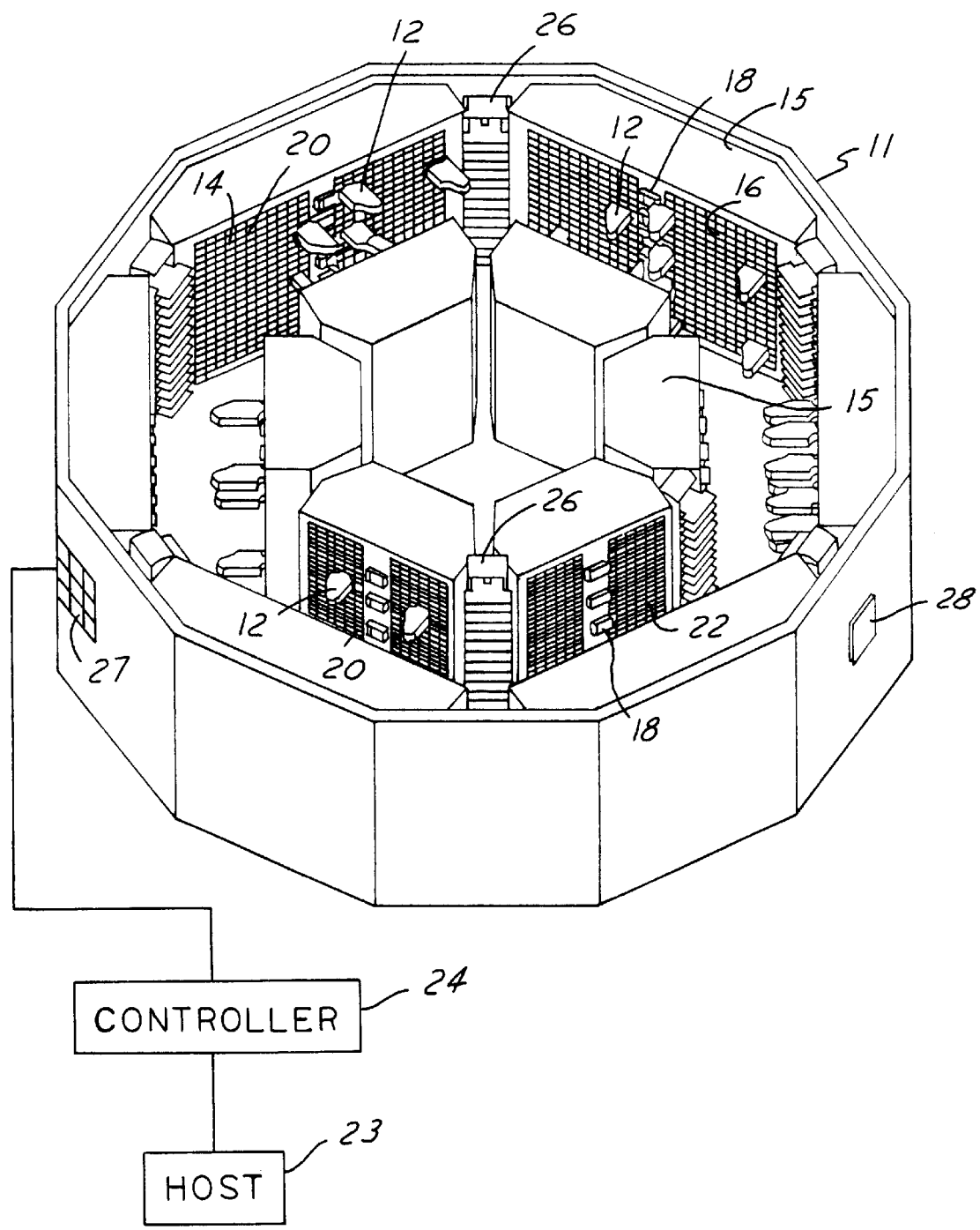
FIG. 1 illustrates a round automated storage library for use with the method of the present invention.

Referring now to FIG. 1, an automated storage library 10 for use with the method of the present invention is shown. Storage library 10 includes a cylindrical housing enclosure 11 containing multiple independent robotic mechanisms (robotic pods or accessors) 12 to enable the storage library to concurrently manipulate different media cartridges 14. Storage library 10 includes a plurality of arrays 15 of media cartridge storage cells 16 and media cartridge players 18 mounted in frames 20. A system of horizontal tracks 22 guide robotic mechanisms 12 through all of the locations of the arrays. Each pair of tracks corresponds to a respective row of an array. Media cartridge storage cells 16 and media cartridge players 18 are positioned in the rows of the arrays. Each media cartridge storage cell 16 is designed to house a single media cartridge 14. Each robotic mechanism 12 is operable to move on guide tracks 22 around storage library 10 to access media cartridge storage cells 16 and media cartridge players 18. Robotic mechanisms 12 contain a movable carriage that is capable of transporting robotic components, such as media cartridge pickers, bar code reading devices, and other task oriented sub-modules on guide tracks 22 of storage library 10.

Robotic mechanisms 12 are attached to the frames via guide tracks 22 which serve to frame media cartridge storage cells 16 and media cartridge players 18 on the top and bottom sides thereof. Media cartridge storage cells 16 are populated with media cartridges 14 of any arbitrary type. Guide tracks 22 provide support of robotic mechanisms 12 in the vertical direction to oppose the force of gravity, and they also provide a meshing surface of a suitable design to impart traction in the horizontal direction for motive transport of the robotic mechanisms. Robotic mechanisms 12 may each incorporate drive means for propulsion in the horizontal direction along a guide track 22.

Storage library 10 further includes vertical elevator assemblies 26 that enable the transfer of robotic mechanism 12 in the vertical direction. When a vertical displacement is required of any robotic mechanism 12, an elevator station is scheduled to move in alignment to the appropriate level of rows of a storage array to allow transfer of the robotic mechanism onto the elevator station. Once robotic mechanism 12 is located on the elevator station, elevator assembly 26 is activated to transport the robotic mechanism to a selected one of the rows of the storage array. Robotic mechanism 12 then exits the elevator station and moves onto the selected row.

Storage library 10 further includes a cartridge access port 28 for enabling media cartridges to be inserted into the storage library and removed from the storage library.

A host 23 communicates with a storage library controller 24 to retrieve and store information in storage library 10. Controller 24 communicates with storage library 10 through an operator panel 27 located on the storage library. Controller 24 provides commands to robotic mechanisms 12 to manipulate media cartridges 14. Controller 24 communicates with each robotic mechanism 12 individually by radio frequency communication links, infrared communication links, or other wireless links. Wired communication links may also be used. Commands to robotic mechanisms 12 include movement along guide tracks 24, movement of media cartridges 14 into and out of the robotic mechanisms, reading bar codes on the media cartridges, and the like.

Controller 24 and robotic mechanisms 12 are operable with one another such that the controller knows the position of the robotic mechanisms within storage library 10 as they move about guide tracks 22. This is accomplished by mounting position sensors on robotic mechanisms 12 which provide information regarding the position of the robotic mechanisms to controller 24. This may also be accomplished by providing sensors on guide tracks 22 which are actuated to transmit a signal to controller 24 when a robotic mechanism 12 traverses a sensor on the guide track. This may be further accomplished by having robotic mechanisms 12 provide information regarding the speed and direction of their travels through storage library 10. Controller 24 may also be operable with media cartridge storage cells 16 and media cartridge players 18 to know the location of media cartridges 14 during operation of storage library 10.

Controller 24 may also be in communication with media cartridge players 18. Controller 24 may provide commands to mount and dismount media cartridges 14 into and out of media cartridge players 18. Controller 24 coordinates these commands with positioning commands to a robotic mechanism 12 that supplies or receives a media cartridge 14 to and from a media cartridge player 18.

In accordance with the method and system of the present invention, controller 24 determines a robotic mechanism(s) 12 from the plurality of robotic mechanisms that is best suited to perform a job. For example, the job may be to retrieve a particular media cartridge(s) and mount it in a particular media cartridge player(s); to dismount a particular media cartridge(s) from a particular media cartridge player(s); to read the label of a particular media cartridge(s); to perform a fast/slow mount/dismount; etc. Controller 24 uses a decision algorithm based on various inputs for determining which robotic mechanism 12 is best suited to perform a requested job. For instance, the inputs may be to use fast, modern, or reliable robotic mechanisms for particular jobs and slow, old, or unreliable robotic mechanisms for other jobs; to give priority for certain job requests over other job requests; to use certain types of robotic mechanisms for certain types of media cartridges; etc. In response to receiving a job request, controller 24 identifies and selects a robotic mechanism 12 best suited to perform the job and then instructs the selected robotic mechanism to perform the job.

Figure 2:
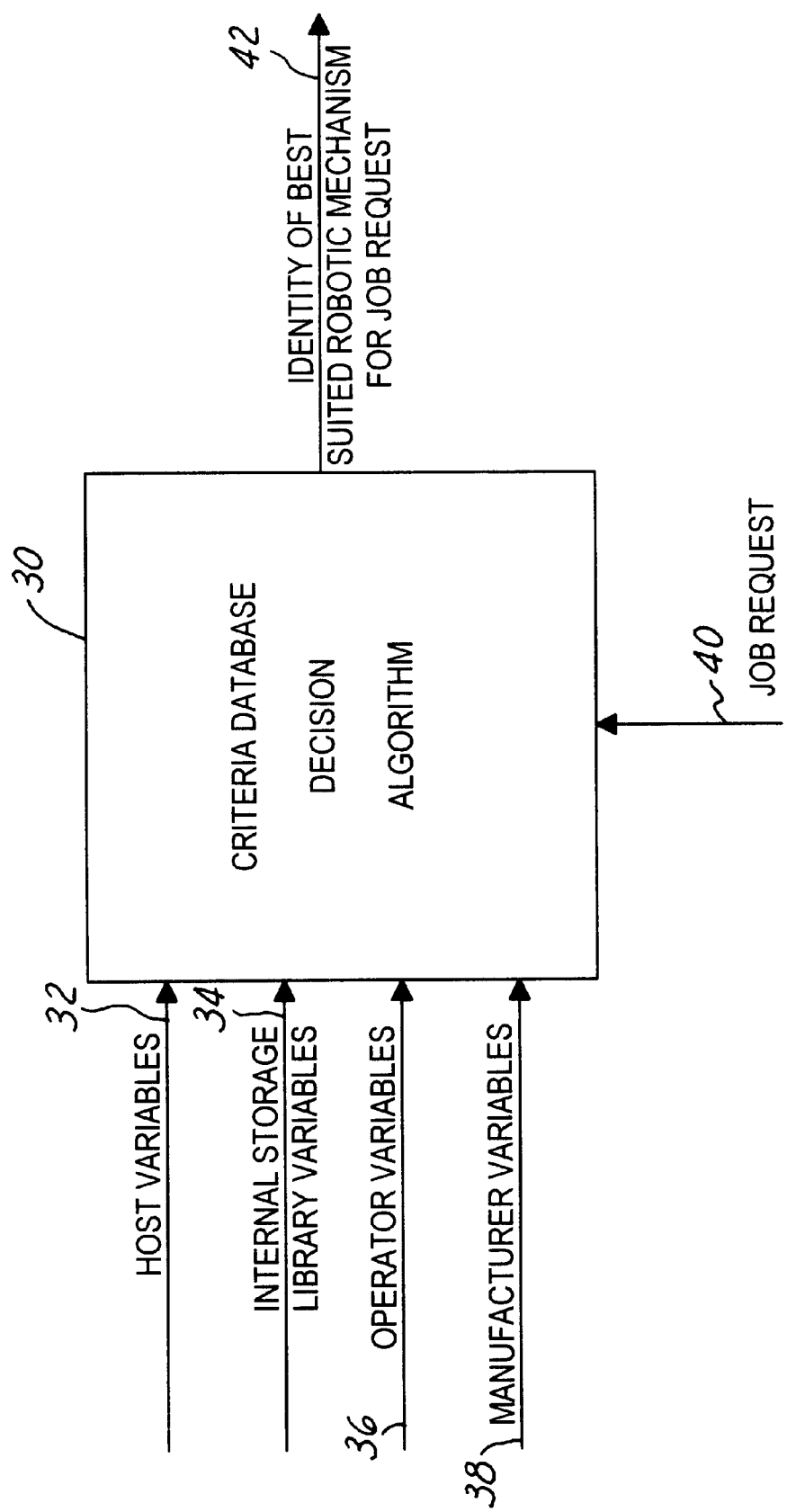
FIG. 2 illustrates a criteria database used by an automated storage library controller for selecting a robotic mechanism best suited for performing a job request.

Referring now to FIG. 2, a criteria database 30 used by controller 24 for selecting a robotic mechanism 12 best suited for performing a job is shown. Criteria database 30 forms a decision algorithm based on various inputs. The inputs include host variables 32, internal storage library variables 34, operator variables 36, and manufacturer variables 38. In response to a job request input 40, the decision algorithm of criteria database 30 provides an output 42 indicative of the identity of a robotic mechanism 12 best suited for performing the requested job. In determining the selected robotic mechanism 12, criteria database 30 compares the attributes of each robotic mechanism, media cartridge, media cartridge player, etc., with the attributes of the input variables and the requested job.

The four types of input variables will now be described along with a description of exemplary input variables associated with each type. The exemplary input variables are just a description of the types of information that may be used by the criteria database when selecting a robotic mechanism best suited to perform a job request.

The host input variables are external to the storage library. The host presets the host input variables into the decision algorithm. The host input variables include 1) job priority, 2) job data set size, 3) job multi-cartridge data set size, and 4) task type (backup vs. nearline vs. background, etc.)

The job priority host input variable takes into account that the host can force settings into the decision algorithm to get access to a robotic mechanism. The job data set size host input variable takes into account that the host can use its knowledge of job record length to put the robotic mechanisms in the most advantageous locations in the storage library to optimize response times. The job multi-cartridge data set size host input variable takes into account that the host can use its knowledge of multi-cartridge data sets to stage the robotic mechanisms for the consecutive mounts in a multi-cartridge job. The job multi-cartridge data set size host input variable takes into account that the host can allocate robotic mechanisms to perform in different modes based on the required tasks. Nearline applications require fast access times requiring many fast robotic mechanisms. Backup tasks require fewer robotic mechanisms per cartridge transport and may use slower robotic mechanisms. Background tasks such as label reading, calibration, or diagnostics would have special requirements or may have special robotic mechanisms within the storage library.

The storage library variables are internal to the storage library. The storage library variables are set in the initial configuration of the storage library and may be updated automatically by the storage library in real time as required. The storage library variables include 1) robotic mechanism type and quantity, 2) media type and quantity, 3) robotic mechanism availability per row or column, 4) number of total robotic mechanisms available, 5) robotic mechanism proximity to media cartridge players, 6) robotic mechanism proximity to media cartridges/cells, 7) robotic mechanism proximity to other robotic mechanisms, 8) collision avoidance (least restricted path of travel), 9) quickest path of travel (vertical vs. horizontal levels), 10) robotic mechanism pre-positioning for dismounts, 11) robotic mechanism pre-positioning for mounts if known, 12) robotic mechanism queuing based on previous jobs done, 13) robotic mechanism serial number, type or FRU level, 14) alternate robotic mechanisms for long life (or use same robotic mechanism for short life), 15) slower dismounts for long life, 16) diagnostic inputs (from error log: motor current, position error, etc.), 17) track condition monitoring database, 18) environment conditions database, 19) audit routine style types, 20) maintenance plan (auto removal of bad robotic mechanisms as required, etc), 21) pass through scheduling, and 22) cartridge access port through scheduling.

The robotic mechanism type and quantity storage library input variable takes into account that in a system of different robotic mechanisms the manufacturer and model number of the robotic mechanisms would determine the robotic mechanism used, if required. The number of robotic mechanisms used per guide track would influence the number of robotic mechanisms available to that guide track. The media type and quantity storage library input variable takes into account that different types of media cartridges may require that specific robotic mechanisms be used. Slower or older robotic mechanisms would be used to load lower performance media. The number of media cartridges per guide track could influence robotic mechanism speed and selection and robotic mechanism parking/staging. The robotic mechanism availability per row or column storage library input variable takes into account that the robotic mechanisms that are not busy may be suitable for use based on location.

The number of total available robotic mechanisms storage library input variable takes into account that the total number of robotic mechanisms may influence robotic mechanism selection. An overabundance of robotic mechanisms allows priorities to be relaxed, while a short supply of robotic mechanisms may demand first come first serve rules. The robotic mechanism proximity to media cartridge players storage library input variable takes into account robotic mechanism move times to and from media cartridge players with the fastest robotic mechanism move time given priority. The robotic mechanism proximity to media cartridges/cells storage library input variable takes into account robotic mechanism move times to and from media cartridges/cells with the fastest robotic mechanism move time given priority. The robotic mechanism proximity to other robotic mechanisms storage library input variable takes into account that a robotic mechanism which is close to another robotic mechanism should be used to place itself in a more random location for the next job. A multiple cartridge job would require that two robotic mechanisms close to each other to move in synchronization. A robotic mechanism mounting a cartridge to a media player could be preceded by an empty robotic mechanism to unload the media player.

The collision avoidance (least restricted path of travel) storage library input variable is used to select robotic mechanisms based on clearest move path. The quickest path of travel (vertical vs. horizontal levels) storage library input variable is used to select a robotic mechanism when a certain track length or vertical mechanism gives the selected robotic mechanism an advantage. The robotic mechanism serial number, type or FRU level storage library input variable is used for selecting robotic mechanisms based on vintage or engineering change levels. The alternate robotic mechanisms for long life (or use same robotic mechanism for short life) storage library input variable takes into account that robotic mechanisms that have just completed a move could be rested in a queue thereby averaging duty cycle. The slower dismounts for long life storage library input variable is used to make the robotic mechanisms perform dismounts slower than performing mounts, thereby reducing component stress.

The diagnostic inputs (from error log: motor current, position error, etc.) storage library input variable uses historical error databases that can be reviewed to identify robotic mechanisms that should be used sparingly or as a last resort. The track condition monitoring database storage library input variable takes into account that if track conditions are known then robotic mechanisms could be controlled to avoid certain areas. The environment conditions database storage library input variable factors environmental conditions such that robotic mechanisms are allocated based on room temperature, room vibration, etc.

The audit routine style types storage library input variable takes into account that allocation of robotic mechanisms for audits of cartridges may be based on which robotic mechanism has a camera onboard, or which robotic mechanism has the camera with the best performance, or which robotic mechanism is closest to a label that was unreadable with a first camera. The maintenance plan (auto removal of bad robotic mechanisms as required, etc) storage library input variable takes into account that allocation of robotic mechanisms may be affected by maintenance standards. Operators paying for maintenance contracts may want to allocate robotic mechanisms to give higher performance, while operators paying their own damages may want to allocate robotic mechanisms based on cost. The pass through scheduling and the cartridge access port storage library input variables take into account that allocation of robotic mechanisms is influenced by specialized job types. Robotic mechanisms can be prioritized for passing cartridges to load ports, etc.

The operator input variables are external to the storage library. An operator uses the operator panel of the storage library to set up the operator input variables. The operator input variables are preset for long life vs. speed, etc. The operator input variables include 1) each of the storage library variables identified above, and 2) time settings (operator intensive, etc.).

The operator can override the storage library internal settings with new operator input variables. The operator can characterize the storage library allocation choices. The needs of the operator may change while the storage library is in service. Pre-allocation variables may not apply to the operator's installation, or the job flow demands special settings. The time settings operator input variable takes into account that time of day settings may be relevant to storage library throughput. For instance, mass loading or unloading of cartridges from a library load port at a certain time of day could demand more robotic mechanisms nearer the load port, or allocation of robotic mechanisms could be set to prioritize load jobs.

The manufacturer input variables are imported into the storage library. The manufacturer uses an Internet or other type of connection or software to load variables into the local decision algorithm. The manufacturer input variables include 1) engineering change level of hardware and software, 2) update configurations, 3) performance upgrades, 4) marketing requirements, and 5) operator special requirements.

The engineering change level of hardware and software manufacturer input variable changes the allocation strategy in response to hardware or software engineering changes. The update configuration manufacturer input variable takes into account that storage library configurations (transport type, library type, etc.) require allocation algorithm updates. The performance upgrade manufacturer input variable takes into account that various performance options that change the allocation algorithm may be provided by the manufacturer. The marketing requirements manufacturer input variable takes into account miscellaneous marketing requirements that could change the allocation scheme. The operator special requirements manufacturer input variable takes into account that operators may request special allocation schemes.

Figure 3:
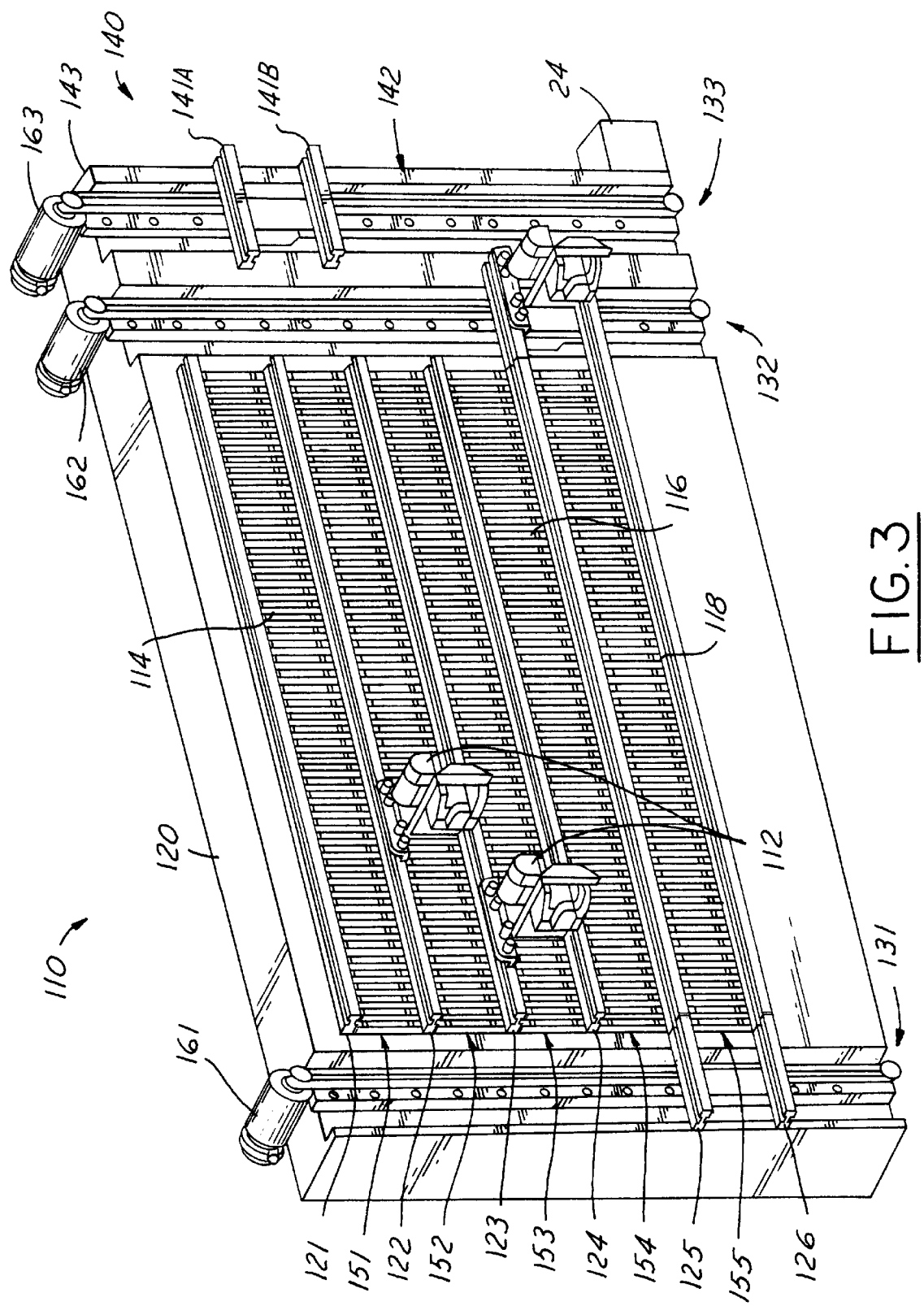
FIG. 3 illustrates a rectangular automated storage library for use with the method and system of the present invention.

Referring now to FIG. 3, a rectangular automated storage library 110 for use with the method and system of the present invention is shown. Storage library 110 includes multiple robotic mechanisms 112 to enable the storage library to concurrently manipulate multiple media cartridges 114. Storage library 110 includes a two-dimensional vertical standing array of media cartridge storage cells 116 and media cartridge players 118 that are mounted in a frame 120. A system of guide tracks 121–126 is used to guide robotic mechanisms 112 through all of the locations of the array.

Frame 120 is designed to receive a plurality of rows 151–155 of media cartridge storage cells 114. Media cartridge players 118 are shown in an arbitrary location in a horizontal row 155 at the bottom of frame 120, although storage library 110 can incorporate the media cartridge players at any location in the frame. Robotic mechanisms 112 are attached to frame 120 via horizontal guide tracks 121–126 which serve to frame media cartridge storage cells 114 and media cartridge players 118. Tracks 121–126 provide support of robotic mechanisms 112 in the vertical direction to oppose the force of gravity, and they also provide a meshing surface of a suitable design to impart traction in the horizontal direction for motive transport of the robotic mechanisms. Robotic mechanisms 112 each incorporate drive means for propulsion in the horizontal direction along guide tracks 121–126.

Storage library 110 further include vertical elevator assemblies 131–133 that enable the transfer of robotic mechanisms 112 in the vertical direction. Each of vertical assemblies 131–133 includes a set of vertical rails 142 that extend substantially from the top of frame 120 to the bottom of the frame. Vertical rails 142 support elevator stations 140 each of which contain short horizontal track segments 141A, 141B that are identical in cross section to the main horizontal guide tracks 121–126. Elevator stations 140 are held in suspension by drive belts 143 which wrap around a respective drive pulley attached to a respective vertical drive motor 161–163. When a vertical displacement is required of any robotic mechanism 112, controller 24 schedules vertical elevator 140 to move in alignment to the appropriate level of rows 151–155 to allow transfer of the robotic mechanism onto the elevator track segments 141A, 141B from the pair of horizontal guide tracks 121–126 that are juxtaposed and abutting to elevator track segments 141A, 141B. Once robotic mechanism 112 is located on elevator station 140, drive motor 163 is activated to transport the robotic mechanism to a selected one of rows 151–155 and thence moves on to the pair of horizontal guide tracks 121–126 that correspond to the selected row.

In accordance with the description with respect to FIGS. 1 and 2, controller 24 determines a robotic mechanism 112 from the multiple robotic mechanisms best suited to perform a job. In addition to considering attributes of robotic mechanisms 112, media cartridges 114, and media cartridge players 118, the controller may also consider attributes of elevator assemblies 131–133 when selecting a robotic mechanism best suited for performing the job.

An example of how a decision algorithm formed by criteria database 30 may work is as follows. Assume the following input variables are available: 1) robotic mechanism availability, 2) robotic mechanism time to complete requested job, 3) robotic mechanism position relative to other robotic mechanisms, and 4) robotic mechanism position after job completion. For each available robotic mechanism, the decision algorithm applies weighting factors to each of the input variables. The weighting factors are then summed and the highest value determines which robotic mechanism to select for a job.

A large negative weighting factor is applied to the first variable (robotic mechanism availability) so that non-operational robotic mechanisms are not selected. A large positive weighting factor is applied to the second variable (robotic mechanism time to complete requested job) in order to favor the robotic mechanism that can complete the job in the shortest time. A relative positive weighting factor for the third variable (robotic mechanism relative position) discourages the use of a robotic mechanism if other available robotic mechanisms would be forced to move out of the way in order for the particular robotic mechanism to complete the requested job. The weighting factor for the fourth variable (robotic mechanism position after job completion) is weighted to discourage the use of a robotic mechanism if this robotic mechanism would be left in the way of a second robotic mechanism forcing the second robotic mechanism to wait in order to complete the job request.

As an example, the pseudocode would look like:

For each available robotic mechanism (robot)
    Sum [robot]=0
    For each input variable
        Sum [robot]=Sum [robot]+(input variable [input] *weighting factor [input])
    End
End
Max_sum, Robot=Max (Sum)
If Max_sum<0
    Fail job request, no robot available to complete job request.
Else
    Allocate robot to perform job request
    Initiate robot
End Thus it is apparent that there has been provided, in accordance with the present invention, a method and system for selecting a robotic mechanism best suited to perform a job from multiple robotic mechanisms in an automated storage library that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An automated storage library for the storage and retrieval of media objects, the storage library comprising:

a frame having a plurality of media object storage cells for storing media objects and at least one media object player for playing the media objects;

a plurality of different types of robotic mechanisms for performing the same type of tasks with each robotic mechanism being movable within the frame to mount a media object from a media object storage cell into the at least one media object player and to dismount a media object from the at least one media object player into a media object storage cell; and a controller for gathering variables in a criteria database to form a decision algorithm, the variables including attributes of each robotic mechanism type and attributes of each of the robotic mechanisms, the media objects, and the at least one media object player, the controller operable for transferring attributes of a job request into the decision algorithm, and then using the decision algorithm to select a robotic mechanism best suited for performing the job request based on the attributes of each robotic mechanism type and the attributes of the robotic mechanisms, the media objects, the at least one media object player, and the job request.

2. The storage library of claim 1 wherein:

the controller is operable for controlling the selected robotic mechanism to perform the job request.

3. The storage library of claim 1 wherein:

the controller gathers variables from a host connected to the storage library.

4. The storage library of claim 3 wherein:

the host variables include information regarding at least one of job priority, job data set size, and job multi-cartridge data set size.

5. The storage library of claim 1 wherein:

the controller gathers variables preset internal to the storage library.

6. The storage library of claim 5 wherein:

the internal storage library variables include information regarding at least one of media object type, media object quantity, and media object position.

7. The storage library of claim 5 wherein:

the internal storage library variables include information regarding at least one of media object player type, media object player quantity, and media object player position.

8. The storage library of claim 5 wherein:

the internal storage library variables include information regarding at least one of robotic mechanism availability, and robotic mechanism proximity to media objects, media object players, and other robotic mechanisms.

9. The storage library of claim 5 wherein:

the internal storage library variables include information regarding robotic mechanism time required to complete the job request.

10. The storage library of claim 5 wherein:

the internal storage library variables include information regarding at least one of robotic mechanism age, robotic mechanism reliability, robotic mechanism condition, and robotic mechanism identification number.

11. The storage library of claim 5 wherein:

the internal storage library variables include information regarding at least one of storage library guide track conditions, storage library environmental conditions, and storage library maintenance.

12. The storage library of claim 1 wherein:

the controller gathers variables from an operator of the storage library.

13. The storage library of claim 12 wherein:

the operator variables include information regarding time of operation of the storage library.

14. The storage library of claim 1 wherein:

the controller gathers variables from a manufacturer of the storage library.

15. The storage library of claim 14 wherein:

the manufacturer variables include information regarding storage library performance upgrades, marketing requirements, and special operator requirements.

16. The storage library of claim 1 wherein:

the frame is a rectangular frame.

17. The storage library of claim 1 wherein:

the frame is a round frame.

* * * * *